United States Patent
Kunieda

(10) Patent No.: US 8,300,925 B2
(45) Date of Patent: Oct. 30, 2012

(54) IMAGE PROCESSING APPARATUS, IMAGE PROCESSING METHOD, AND MEDIUM STORING PROGRAM THEREOF

(75) Inventor: Hiroyasu Kunieda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 872 days.

(21) Appl. No.: 12/419,635

(22) Filed: Apr. 7, 2009

(65) Prior Publication Data
US 2009/0268940 A1    Oct. 29, 2009

(30) Foreign Application Priority Data
Apr. 25, 2008    (JP) .................................. 2008-116296

(51) Int. Cl.
*G06K 9/62* (2006.01)

(52) U.S. Cl. ........ 382/159; 382/100; 382/154; 382/151; 382/209; 382/212; 382/232; 382/276; 382/279; 345/419; 345/629; 348/46; 348/47; 348/49

(58) Field of Classification Search .................. 382/159, 382/100, 154, 151, 209, 212, 232, 276, 279; 345/419, 629; 348/46, 47, 49
See application file for complete search history.

(56) References Cited

U.S. PATENT DOCUMENTS

| | | | |
|---|---|---|---|
| 7,058,232 B1 | 6/2006 | Miyake | 382/252 |
| 7,164,778 B1 * | 1/2007 | Nakamura et al. | 382/100 |
| 7,277,557 B2 | 10/2007 | Ihara | 382/100 |
| 2006/0039581 A1 * | 2/2006 | Decker et al. | 382/100 |
| 2006/0193491 A1 | 8/2006 | Nakamura et al. | 382/100 |
| 2006/0204032 A1 | 9/2006 | Nakamura et al. | 382/100 |
| 2006/0280331 A1 * | 12/2006 | Chosson et al. | 382/100 |

FOREIGN PATENT DOCUMENTS

| | | |
|---|---|---|
| JP | 06-113116 A | 4/1994 |
| JP | 2001-148778 | 5/2001 |
| JP | 2002-238037 A | 8/2002 |
| JP | 2003-060889 A | 2/2003 |
| JP | 2003-78756 | 3/2003 |
| JP | 2004-140764 | 5/2004 |
| JP | 2007-068098 A | 3/2007 |
| JP | 2007-267280 A | 10/2007 |
| JP | 2008-029007 A | 2/2008 |

OTHER PUBLICATIONS

Japanese Office Action dated Feb. 3, 2012, issued by the Japanese Patent Office, in Japanese Patent Application No. 2008-116296.

* cited by examiner

*Primary Examiner* — Mike Rahmjoo
(74) *Attorney, Agent, or Firm* — Fitzpatrick, Cella, Harper & Scinto

(57) ABSTRACT

An image processing apparatus that superimposes additional information on image data, the apparatus sets, in the image data, a main region in which the superimposing intensity for superimposing the additional information is constant, and a superimposing intensity change region in which the superimposing intensity for superimposing the additional information is not constant, sets, the superimposing intensity according to the target pixel in the superimposing intensity change region, and superimposes the additional information on image data using the set superimposing intensity.

11 Claims, 17 Drawing Sheets

IMAGE PROCESSING APPARATUS, IMAGE PROCESSING METHOD, AND MEDIUM STORING PROGRAM THEREOF

BACKGROUND OF THE INVENTION

1. Field of the Invention

The present invention relates to an image processing apparatus that superimposes additional information onto image information, a method thereof and a medium storing a program thereof.

2. Description of the Related Art

Research has been actively conducted recently on superimposing special information on image information (image data), for the purpose of, for example, preventing unauthorized copying and tampering with data. Generally, such a technique is known as digital watermarking (superimposing). For example, additional information regarding the creator, presence or absence of use permission, and the like is superimposed on the image information of digitized photographs and paintings. In a recently-standardized technique, additional information is superimposed on the original image information so that the additional information is difficult to distinguish visually, and the image information is distributed via a network such as the Internet. However, it is known that image quality may be degraded when such superimposing processing is performed on image information, and various methods for ameliorating such degradation of image quality have been proposed.

Japanese Patent Laid-Open No. 2004-140764 (U.S. Pat. No. 7,277,557) describes a method for creating a pattern at the time of superimposing according to the size, embedding intensity, and pattern attenuation rate. Particularly, this document describes setting the pattern attenuation rate, which makes it possible to make pattern recognition processing efficient and suppress degradation of the image quality of an input image without generating edges between patterns. Furthermore, Japanese Patent Laid-Open No. 2003-078756 (U.S. Pat. No. 7,164,778) describes a method for changing the intensity of the watermark pattern according to the regional complexity of the image. The document also describes that regional complexity of an image using a comparatively large value in a texture region and a comparatively small value in a flat region or an edge portion can be created, which comparatively improves the robustness of digital watermarks.

With recent advancements in digital watermark techniques, it is becoming possible to superimpose larger amounts of information on images of the same size than used in the past. Under such circumstances, for example, when the amount of information to be added is small, in many cases, a technique for performing superimposing processing on parts of an image (regional superimposing) is becoming more common. However, a new problem has emerged, which is the degradation of image quality caused when the regional superimposing is performed in the proximity of boundaries (the proximity of superimposing boundaries) between a region on which the superimposing processing has been performed and a region on which the superimposing processing has not been performed.

The method described in Japanese Patent Laid-Open No. 2004-140764 aims simply to moderate the interference between patterns; however, the degradation of image quality in the proximity of the superimposing boundaries cannot be decreased effectively. Also, in the method described in Japanese Patent Laid-Open No. 2003-078756, superimposing control is performed according to the characteristics of the image, but no control is performed in consideration of the proximity of the superimposing boundaries when the regional superimposing is performed. Therefore, degradation of the image quality in the proximity of the superimposing boundaries cannot be decreased effectively.

The superimposing processing may be performed on the whole area to avoid degradation of image quality in the proximity of the superimposing boundaries. However, in such a case, when the region that requires superimposing is small, the degradation of image quality is caused even in unnecessary regions. Furthermore, performing the superimposing processing on unnecessary regions prolongs the processing time. Finally, when attempting to avoid degradation of image quality in the proximity of the superimposing boundaries by performing the superimposing processing with an intensity that results in less visual influence, there is the chance that it will be impossible to extract data when that data is to be extracted from the image.

SUMMARY OF THE INVENTION

The present invention provides an image processing apparatus that can prevent degradation of image quality in the proximity of superimposing boundaries.

The present invention in its first aspect provides an image processing apparatus that superimposes additional information on image data, the apparatus includes: a region setting unit configured to set, in the image data, a main region in which the superimposing intensity for superimposing the additional information is constant, and a superimposing intensity change region in which the superimposing intensity for superimposing the additional information is not constant, a superimposing intensity setting unit configured to set the superimposing intensity according to the position of a target pixel, and a superimposing unit configured to superimpose the additional information on image data of the target pixel using the superimposing intensity set by the superimposing intensity setting unit, the superimposing intensity being set constant when the position of the target pixel is in the main region, and the superimposing intensity being changed according to the position of the target pixel when the position of the target pixel is in the superimposing intensity change region.

The present invention in its second aspect provides a method for image processing executed in an image processing apparatus that superimposes additional information on image data, the method includes the steps of: setting, in the image data, a main region in which the superimposing intensity for superimposing the additional information is constant, and a superimposing intensity change region in which the superimposing intensity for superimposing the additional information is not constant, setting, in the superimposing intensity change region, the superimposing intensity according to the position of a target pixel, and superimposing the additional information on image data of the target pixel using the superimposing intensity set in the step of setting the superimposing intensity, the superimposing intensity being set constant when the position of the target pixel is in the main region, and the superimposing intensity being changed according to the position of the target pixel when the position of the target pixel is in the superimposing intensity change region.

The present invention in its third aspect provides a computer-readable medium storing an image processing program for superimposing additional information on image data, the program causes a computer to function to: set, in the image data, a main region in which the superimposing intensity for superimposing the additional information is not constant, and a superimposing intensity change region in which the superimposing intensity for superimposing the additional information is not constant, set, in the superimposing intensity change region, the superimposing intensity according to the position of a target pixel, and superimpose the additional information on image data of the target pixel using the superimposing intensity, the superimposing intensity being set constant when the position of the target pixel is in the main region, and the superimposing intensity being changed according to the position of the target pixel when the position of the target pixel is in the superimposing intensity change region.

According to the present invention, degradation of image quality can be prevented in the proximity of superimposing boundaries.

Further features of the present invention will become apparent from the following description of exemplary embodiments with reference to the attached drawings.

DESCRIPTION OF THE EMBODIMENTS

Figure 1:
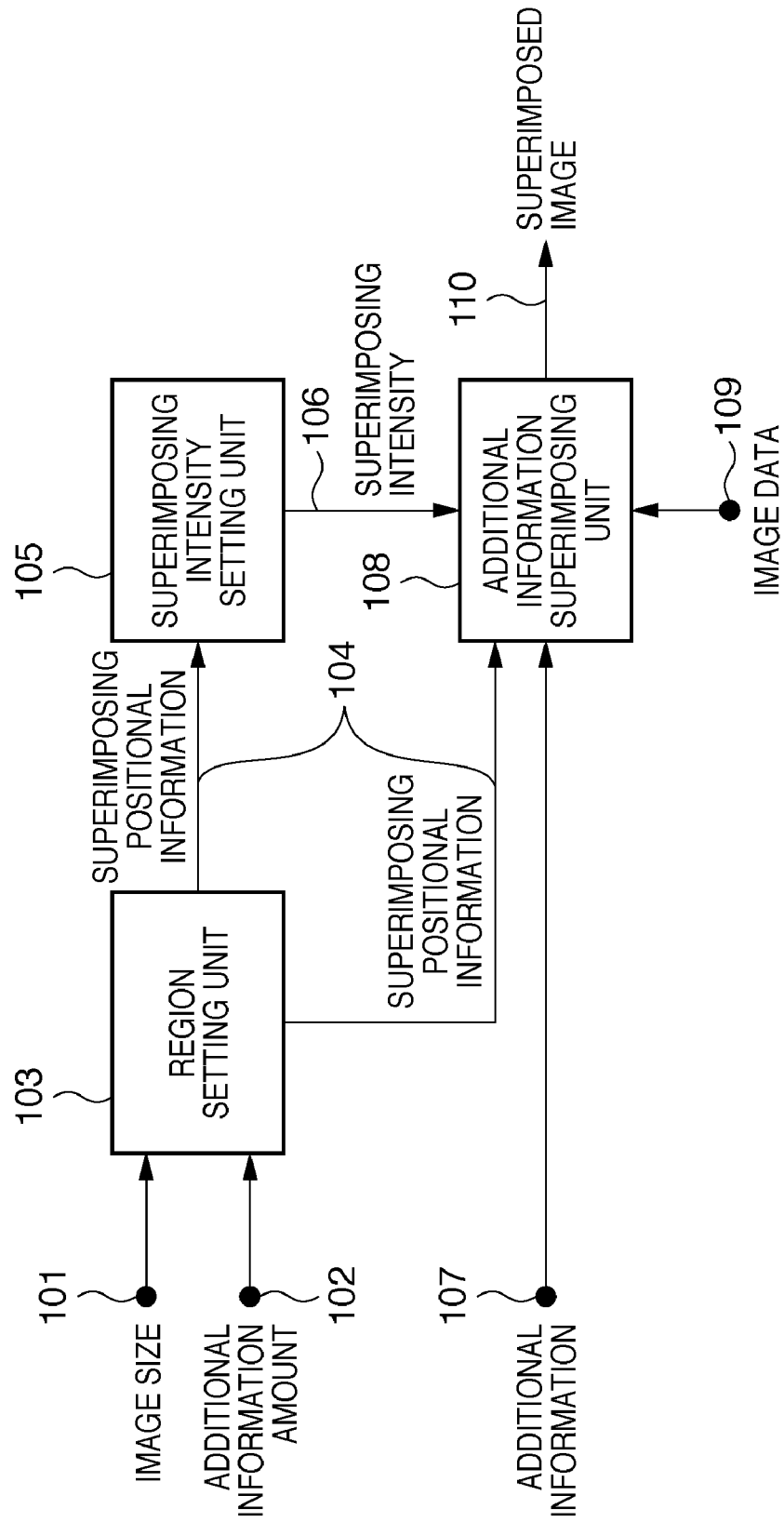
FIG. 1 is a block diagram illustrating the configuration of a superimposing unit of an image processing apparatus in a first embodiment.

Hereinafter, preferred embodiments for carrying out the present invention will be described in detail with reference to the drawings. Note that the same reference numerals will be appended to the same constituent elements, and descriptions thereof will be omitted.

Note that the image processing apparatus in this embodiment is effective mainly when included as application software in a computer, but the image processing apparatus in this embodiment may be effective also when included in a copier and the like as a hardware or some other type of software.

Configuration of First Embodiment

FIG. 1 is a block diagram illustrating the configuration of a superimposing unit of an image processing apparatus in a first embodiment. Note that FIG. 1 only shows the portion relating to the superimposing unit that superimposes additional information on image data.

Figure 19:
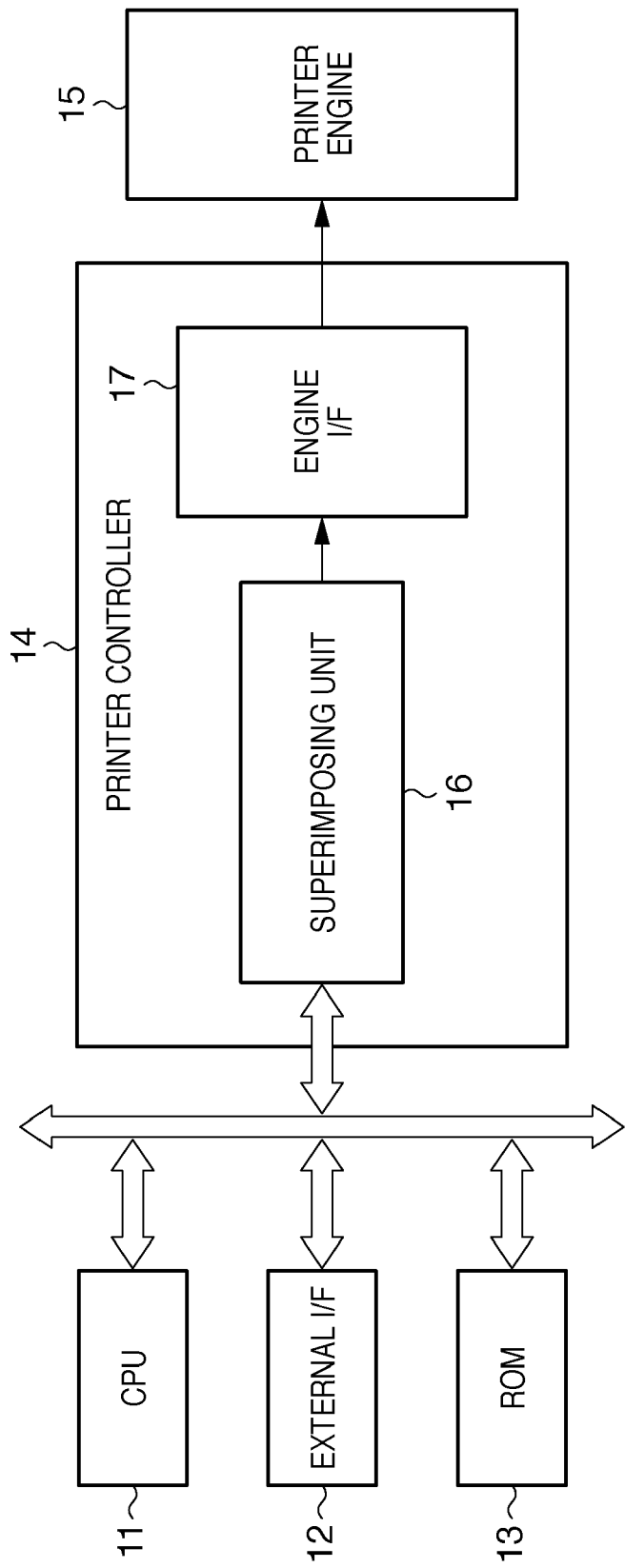
FIG. 19 is a diagram illustrating the overall configuration of an image processing apparatus.

Each block shown in FIG. 1 is, for example, included in a superimposing unit 16 in a printer controller 14 of an image processing apparatus shown in FIG. 19.

A CPU 11 shown in FIG. 19 reads initializing data from a ROM 13, starts running, controls the system, and converts printer language data received from an external I/F 12 to image data. The external I/F 12 is an interface with an external network, and sends and receives data to and from external PCs. The printer controller 14 shown in FIG. 19 processes and temporarily stores the image data, and outputs the image data in response to a request from a printer engine 15. The printer engine 15 receives the image data from the printer controller 14 via an engine I/F 17, and performs print operation on a print medium such as paper. Also, a RAM and the like which play the role of a working memory for the CPU 11 may be connected in the configuration shown in FIG. 19.

Returning again to FIG. 1, as shown in FIG. 1, the size of an image on which the additional information is superimposed is input to a region setting unit 103 from an input terminal 101 shown in FIG. 1, and the information amount of the additional information to be superimposed on the image is input from an input terminal 102. The region setting unit 103 shown in FIG. 1 sets an additional information superimposing region onto which additional information is superimposed within an image region; a superimposing intensity change region in which the superimposing intensity is changed; and an invisible marker setting region for distinguishing the region in which the additional information is embedded. The invisible marker setting region is a region used when performing extraction processing to be mentioned later, and by detecting the invisible marker setting region, the additional information that is superimposed in the region can be extracted from the image data. In the following, a region consisting of the additional information superimposing region and the invisible marker setting region is referred to as a main region. For illustrative purposes, the processing of superimposing the additional information in the image region is performed in block units of an arbitrary size. From the region setting unit 103, the positions of the coordinates of the additional information superimposing region, the superimposing intensity change region, and the invisible marker setting region are output as superimposing positional information 104 to the superimposing intensity setting unit 105 and the additional information superimposing unit 108.

The superimposing intensity setting unit 105 sets the superimposing intensity used when performing superimposing processing, and outputs a superimposing intensity 106 to the additional information superimposing unit 108. The superimposing intensity setting unit 105 holds the superimposing intensity constant when the position of a target pixel is in the aforementioned main region. The superimposing intensity setting unit 105 also changes the superimposing intensity according to the position of the target pixel when the position of the target pixel is in the superimposing intensity change region.

Furthermore, as shown in FIG. 1, the additional information to be superimposed is input to the additional information superimposing unit 108 from an input terminal 107; image data is input from an input terminal 109; and the superimposing positional information 104 is input from the region setting unit 103. The additional information superimposing unit 108 performs superimposing error diffusion processing within the region on which the superimposing processing is performed, on the additional information superimposing region, the invisible marker setting region, and the superimposing intensity change region that are set by the region setting unit 103; and performs normal error diffusion processing in the region on which the superimposing processing is not performed. The additional information superimposing unit 108 outputs a superimposed image 110.

Figure 2:
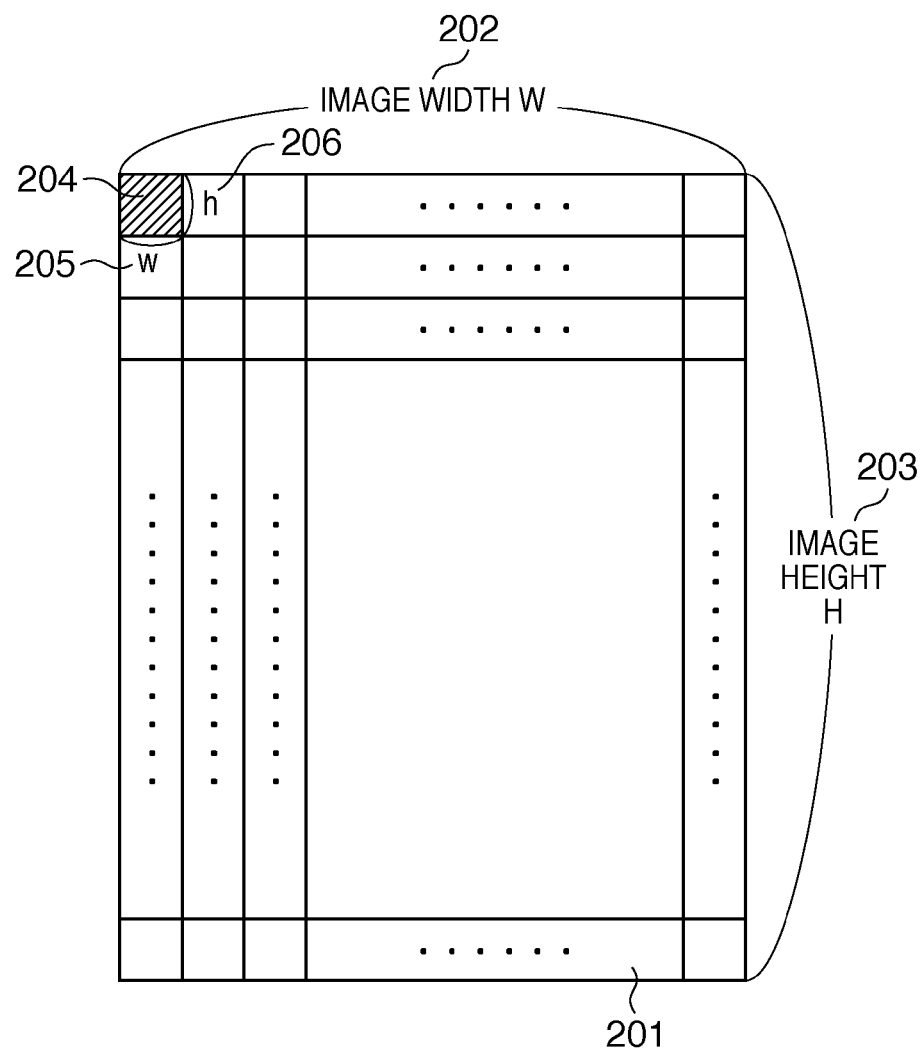
FIG. 2 is a diagram illustrating block division of an image region.

FIG. 2 is a diagram illustrating block division of the image region. An image region 201 indicates, for example, an image region to be printed on paper in the image processing apparatus. The image region 201 is set as a region with an image width 202 of W[pixel], and an image height 203 of H[pixel]; and is divided into blocks of minimum block units. A minimum block 204 for superimposing additional information is given a width 205 of w[pixel] and a height 206 of h[pixel]. A predetermined amount of information is superimposed on one such block. To simplify the descriptions, the width 205 and the height 206 are set to be equal, that is, w=h, in this description.

Figure 3:
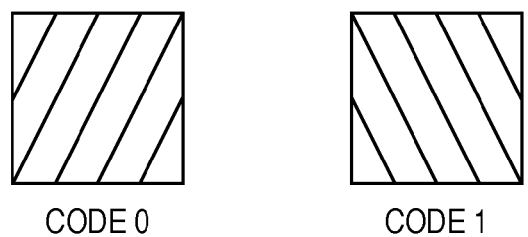
FIG. 3 is a diagram illustrating examples of a periodic pattern with which superimposing is performed on an additional information superimposing region.

FIG. 3 is a diagram illustrating examples of a periodic pattern with which superimposing is performed on the additional information superimposing region. For illustrative purposes, by superimposing two types of periodic patterns shown in FIG. 3 according to the code, one bit's worth of information per block can be superimposed. As shown in FIG. 3, codes of, for example, "0" and "1" are given to the periodic patterns. When the information amount of the additional information to be superimposed is set to N[bit], N blocks are necessary for the superimposing. In this embodiment, the information amount embedded in one block does not particularly need to be one bit.

Figure 4:
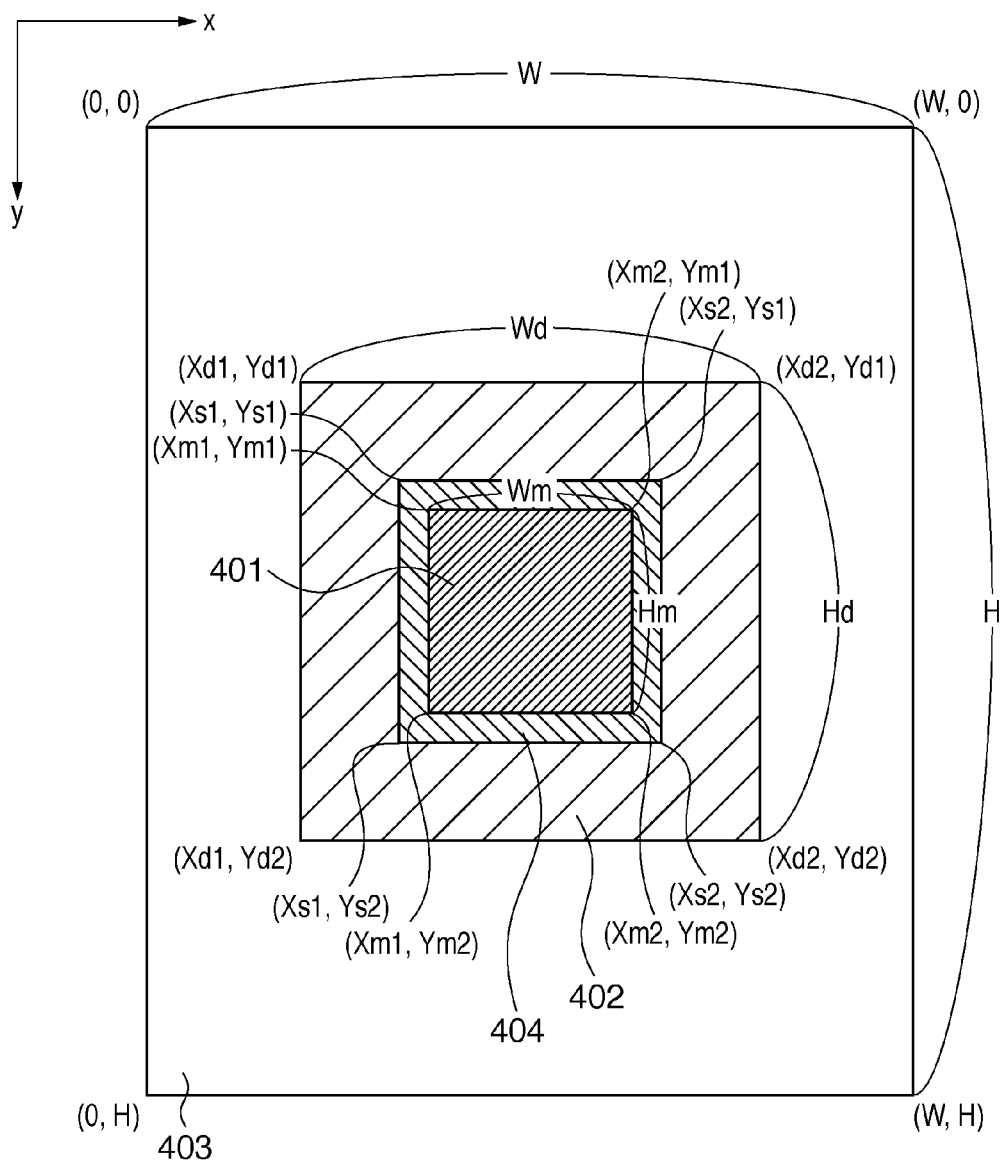
FIG. 4 is a diagram illustrating setting of a region on which additional information is superimposed regionally.

FIG. 4 is a diagram illustrating the setting of a region on which the additional information is superimposed regionally.

An additional information superimposing region 401 is a region in which additional information is superimposed on image data, and N blocks that are necessary for the superimposing are secured therein. As shown in FIG. 4, the additional information superimposing region 401 is a region defined by coordinates (Xm1, Ym1), (Xm2, Ym1), (Xm1, Ym2), and (Xm2, Ym2). In this region, the width is set to Wm[pixel], and the height is set to Hm[pixel]. Although a square (Wm=Hm) is used for the sake of simplicity, the region may have a different shape. The additional information superimposing region 401 is not limited to the center portion of the image; instead, the region may be set to an end portion, or multiple regions to be superimposed may be provided.

A superimposing intensity change region 402 is set so as to surround the additional information superimposing region 401. This region is given a width of Wd[pixel], and a height of Hd[pixel]. However, Wd and Hd are set in an image region 403. The superimposing intensity change region 402 may have a shape other than a square. The superimposing intensity change region 402 may be a predefined region, a region set by a user on a computer, or a region set by automatic calculation based on, for example, the ratio relative to a region on which the superimposing processing is not performed. Herein, a side of the superimposing intensity change region 402 is set as an odd-numbered multiple of a side of the additional information superimposing region 401 on which the superimposing is performed. The width and the height of the superimposing intensity change region 402 are set to Wd=Wm×3 and Hd=Hm×3 respectively, and the region is defined by coordinates (Xd1, Yd1), (Xd2, Yd1), (Xd1, Yd2), and (Xd2, Yd2).

An invisible marker setting region 404 is used when the additional information is extracted from the image during extraction processing. The invisible marker setting region is set by coordinates (Xs1, Ys1), (Xs2, Ys1), (Xs1, Ys2), and (Xs2, Ys2). For the invisible marker setting region 404, a single-block sized region surrounding the additional information superimposing region 401 is secured.

<Parameter Changing Superimposing Intensity>

In the following, an example of superimposing processing is shown, and a superimposing intensity (parameter) that is set at that time is described. Various methods are known as methods for superimposing additional information in the image region, such as a method using a frequency transform such as discrete cosine transform that enables superimposing additional information directly on image data, a method using error diffusion and the like for superimposing additional information on printing paper, and so on. In this embodiment, for superimposing processing in which additional information is superimposed in an image region of a printed product, a method other than the above-described methods may also be used.

In this embodiment, a description is given of, as superimposing processing, a method in which a quantization threshold in an error diffusion method is periodically changed according to additional information for each block in the image divided into blocks. Because this superimposing method is already known through Japanese Patent Laid-Open No. 2001-148778 (U.S. Pat. No. 7,058,232), description shall be given briefly.

Figure 18C:
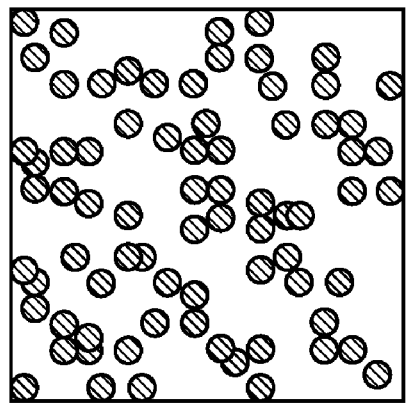
FIG. 18A to FIG. 18C are diagrams for illustrating superimposing error diffusion.
Figure 18B:
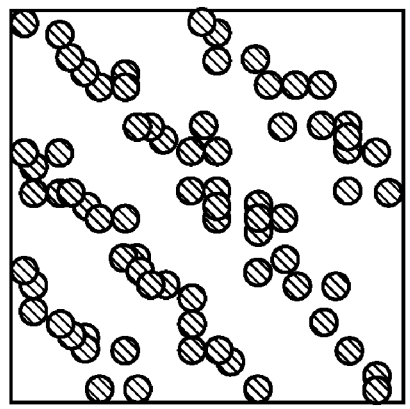
Figure 18A:
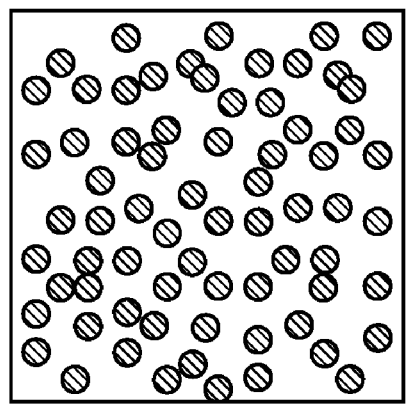

FIGS. 18A to 18C are diagrams for describing superimposing error diffusion, and show diagrams of enlarged printing results of normal error diffusion and superimposing error diffusion in the case when the density in the blocks is uniform. FIG. 18A shows normal error diffusion, FIG. 18B shows superimposing error diffusion when the amplitude is large, and FIG. 18C shows superimposing error diffusion when the amplitude is small.

In normal error diffusion of FIG. 18A, dots are uniformly distributed in the block. In the superimposing error diffusion of FIGS. 18B and 18C, periodic patterns are formed by periodically modulating the quantization threshold according to additional information to be superimposed. Information is superimposed in the image region using such a method. Also, FIGS. 18B and 18C show the result of changing the amplitude of quantization threshold when performing superimposing error diffusion. FIG. 18B shows a case where the amplitude of modulating the quantization threshold is large when creating a periodic pattern, and a pattern is formed clearly in the image. On the other hand, FIG. 18C shows a case where the amplitude of modulating the quantization threshold is small, and a pattern is not clearly formed. Thus, according to the amplitude of the quantization threshold, the intensity of the pattern that is formed changes. As described above, in this embodiment, the amplitude of the threshold at the time of periodically modulating the quantization threshold is used as a parameter for changing the superimposing intensity.

<Setting Superimposing Intensity>

Figure 5:
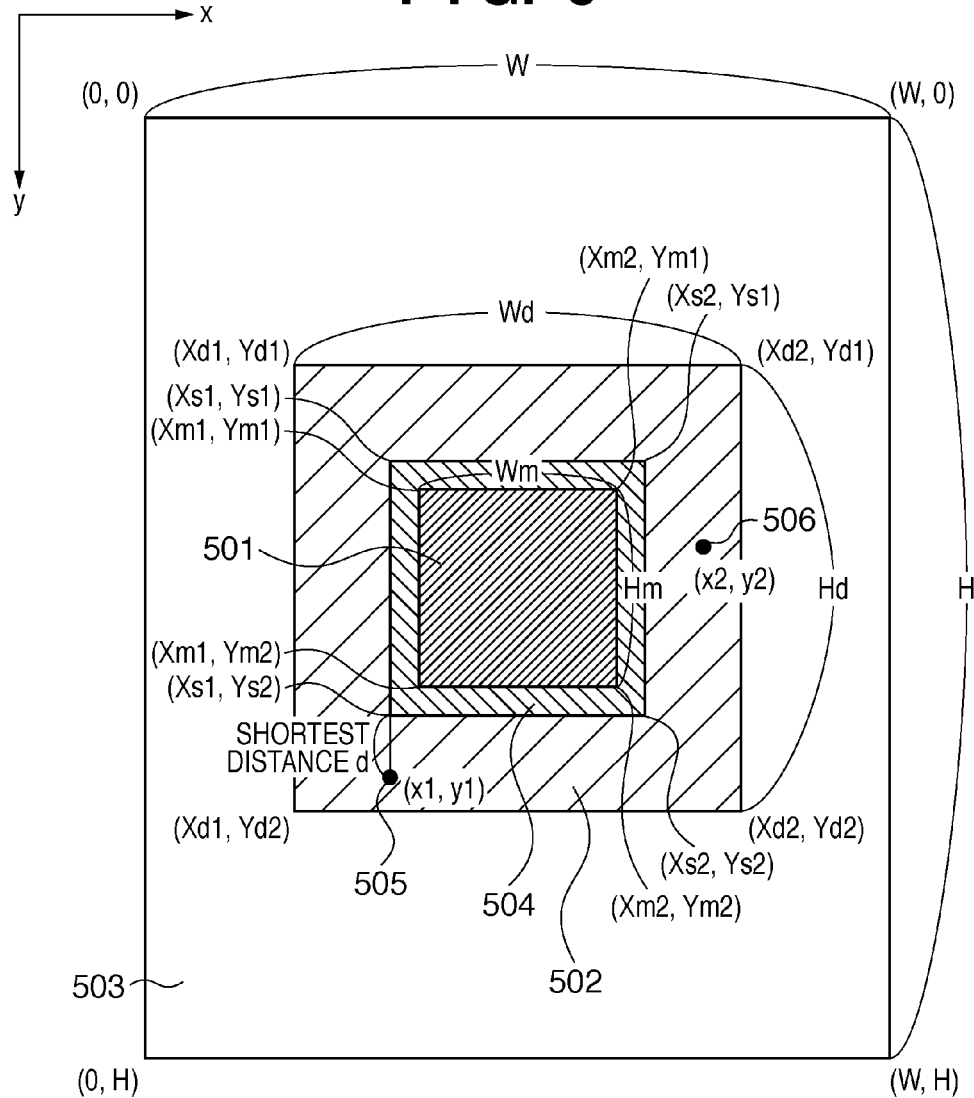
FIG. 5 is a diagram illustrating the setting of superimposing intensity in an embodiment.

FIG. 5 is a diagram illustrating the setting of superimposing intensity in this embodiment. As shown in FIG. 5, an additional information superimposing region 501, a superimposing intensity change region 502, and an invisible marker setting region 504 are set in an image region 503. The image region 503 corresponds to the image region 403 shown in FIG. 4, the additional information superimposing region 501 corresponds to the additional information superimposing region 401 shown in FIG. 4. Also, the superimposing intensity change region 502 corresponds to the superimposing intensity change region 402 shown in FIG. 4, and the invisible marker setting region 504 corresponds to the invisible marker setting region 404 shown in FIG. 4.

Hereinafter, description is given of a case where error diffusion is performed on a processed pixel 505. The processed pixel refers to a targeted pixel in the region. Coordinates of the processed pixel 505 are set to (x1, y1). In this embodiment, first, a determination is made as to which of the above described regions the processed pixel 505 is included in by referring to the setting coordinates in each region.

As a result of the determination, when the processed pixel 505 is included in the additional information superimposing region 501 and the invisible marker setting region 504, the amplitude of threshold, that is, the superimposing intensity, is set to "A", that is, constant. Amplitude "A" is a value through which highly robust characteristics can be brought out when extracting additional information from image data.

Next, when the processed pixel 505 is included in the superimposing intensity change region 502, the superimposing intensity is set according to distance d between the processed pixel 505 and the invisible marker setting region 504. Distance d is calculated according to the following formula (1):

$$d=\sqrt{((x1-Xs1)^2+(y1-Ys2)^2)} \quad (1)$$

where x1<Xs1 and y1>Ys2.

Formula (1) is a formula that calculates distance between the processed pixel 505 and the invisible marker setting region 504 when the processed pixel 505 is present in the region shown in FIG. 5. When the processed pixel 505 is present in other positions, Xs1 and Ys2 are changed so that the shortest distance from the invisible marker setting region 504 can be calculated.

For example, when the processed pixel 505 is present in "x1<Xs1 and y1<Ys1", the distance d can be obtained from $d=\sqrt{((x1-Xs1)^2+(y1-Ys1)^2)}$. Also, when the processed pixel 505 is present in "x1>Xs2 and y1<Ys1", distance d can be obtained from $d=\sqrt{((x1-Xs2)^2+(y1-Ys1)^2)}$. Also, when the processed pixel 505 is present in "x1>Xs2 and y1>Ys2", the distance d can be obtained from $d=\sqrt{((x1-Xs2)^2+(y1-Ys2)^2)}$.

When the processed pixel 505 is present at a position other than the above in the superimposing intensity change region 502, the distance to a side of the invisible marker setting region 504 is obtained. For example, in the case of a processed pixel 506 shown in FIG. 5, "x2−Xm2" will be the distance d.

Using distance d calculated by formula (1), and setting the amplitude of the quantization threshold in the processed pixel 505 as "A", "A'" is calculated according to formula (2):

$$A'=d/(Yd2-Ys2)\times A \quad (2)$$

where Yd2>Ys2.

Formula (2) is a formula that calculates the superimposing intensity in the case when the processed pixel is present in the region shown in FIG. 5. When the processed pixel 505 is present at other positions, (Yd2−Ys2) is changed according to that region. For example, in the case of the processed pixel 506, the distance is "A'=d/(Xd2−Xs2)×A".

As shown in formula (2), the longer the distance from the invisible marker setting region 504, the smaller the amplitude "A'" of the quantization threshold, decreasing the superimposing intensity. Although the changing rate of the superimposing intensity is set using the ratio of distance d relative to the distance between the invisible marker setting region 504 and the superimposing intensity change region 502 in formula (2), the changing rate may be set by another method, such as, for example, changing the superimposing intensity by using random numbers. Also, a plurality of parameters may be controlled.

The superimposing intensity "A'" that is set as described above is output to the additional information superimposing unit 108. The additional information superimposing unit 108 superimposes additional information using the above-described periodic pattern on the additional information superimposing region 501. Also, the additional information superimposing unit 108 performs superimposing on the invisible marker setting region 504 and the superimposing intensity change region 502 using a periodic pattern that is different from the pattern used on the additional information superimposing region 501.

Figure 6:
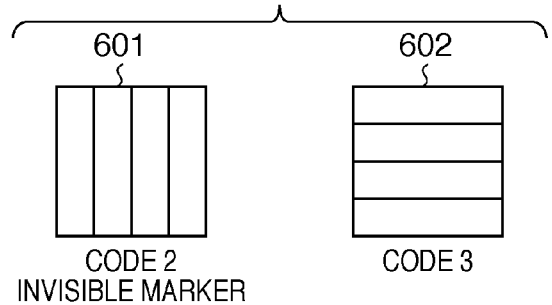
FIG. 6 is a diagram illustrating examples of a pattern used in an invisible marker setting region and a superimposing intensity change region.

FIG. 6 is a diagram illustrating examples of a pattern used in the invisible marker setting region 504 and the superimposing intensity change region 502. A pattern 601 is a pattern used in the invisible marker setting region 504, and a code "2" is given thereto. Also, a pattern 602 is a pattern used in the superimposing intensity change region 502, and a code "3" is given thereto. The patterns shown in FIG. 6 may be a pattern other than those shown. A code that is the same as that of the additional information may be given to the invisible marker setting region and the superimposing intensity change region.

<Summary of Superimposing Operation>

Hereinafter, a summary of processing in which additional information is superimposed on image data in this embodiment is described.

First, it is determined in which region the coordinates of the processed pixel 505 are included among the regions shown in FIG. 5, and processing is performed according to the settings for each region. When the processed pixel 505 is included in the additional information superimposing region 501, the additional information that is input is superimposed. The amplitude of the quantization threshold used at that time is "A". When the processed pixel 505 is included in the invisible marker setting region 504, code "2" is superimposed. The amplitude of the quantization threshold used at that time is "A". Also, when the processed pixel is included in the superimposing intensity change region 502, code "3" is superimposed. The amplitude of the quantization threshold used at that time is "A'". "A'" is a superimposing intensity set according to the distance from the invisible marker setting region 504. When the coordinates of the processed pixel 505 are included in a region other than the above-described regions, normal error diffusion processing is performed without performing the superimposing processing.

By executing the above processing on the entire image data of processing target, a regionally superimposed image is created. The superimposed image 110 that went through the superimposing processing performed by the additional information superimposing unit 108 is output, and the output superimposed image 110 can be used as, for example, print data for print processing for forming a superimposed image on a medium.

Although the superimposing method using error diffusion is described above, the same processing can also be performed also when using a frequency transform such as a discrete cosine transform. In superimposing processing using a discrete cosine transform, additional information is superimposed by changing an arbitrary value in a quantization table according to the additional information. At that time, when the amount of change in the quantization table is small, the visual influence will be small, whereas when the amount of change is large, the visual influence will be large. Therefore, the amount of change in the quantization table will become the superimposing intensity, and the same processing as that performed in the superimposing method using error diffusion can be performed.

<Multiplexing Operation Flow>

Figure 7:
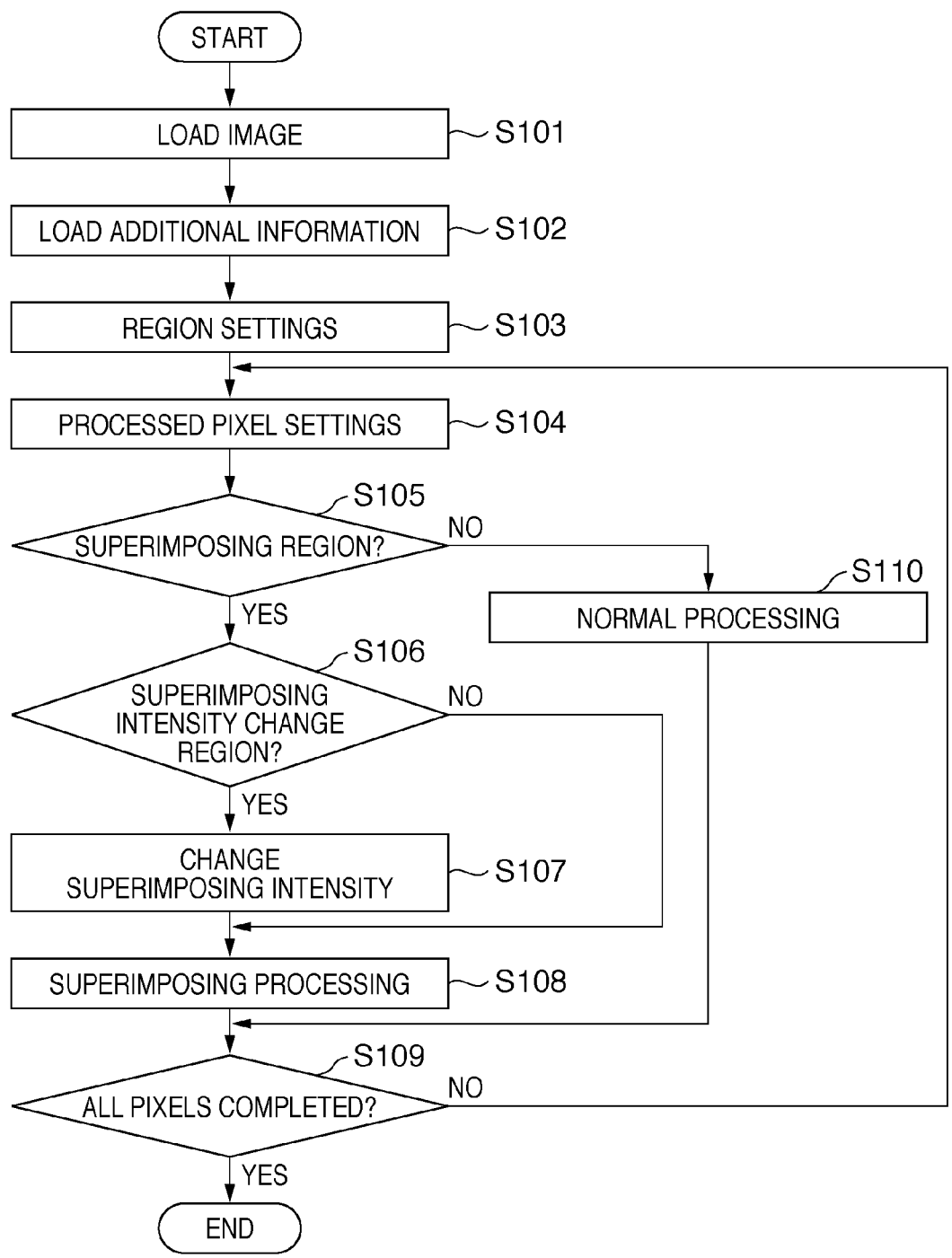
FIG. 7 is a flowchart illustrating processing procedures performed by the image processing apparatus in the first embodiment shown in FIG. 1.

Next, processing procedures performed by the image processing apparatus with the above-described configuration are described. FIG. 7 is a flowchart illustrating processing procedures performed by the image processing apparatus in the first embodiment shown in FIG. 1. First, in step S101, image data is loaded, and in step S102, additional information to be superimposed is loaded.

In step S103, the image size and the information amount of the additional information that have been obtained from the loaded image data and the additional information are input into the region setting unit 103. The region setting unit 103 sets the additional information superimposing region 501, the invisible marker setting region 504, and the superimposing intensity change region 502.

In this example, a region corresponding to an odd-numbered multiple of the additional information superimposing region 501 is set as the superimposing intensity change region 502. For the invisible marker setting region 504, a single-block sized region surrounding the additional information superimposing region 501 is secured.

In step S104, the processed pixel 505 is set, and in step S105, it is determined whether or not the processed pixel 505 set by the superimposing intensity setting unit 105 is present in the region on which the superimposing processing is performed. The processed pixel 505 may be set, for example, sequentially from the start point of loading data in the image region.

In step S106, when it is determined that the processed pixel 505 is in the region on which superimposing processing is performed, it is further determined whether or not the processed pixel 505 is present in the superimposing intensity change region 502. When it is determined that the processed pixel 505 is in the superimposing intensity change region 502, in step S107, the superimposing intensity is calculated from the formulae (1) and (2), and amplitude "A'" of the quantization threshold is set. On the other hand, when it is determined that the processed pixel 505 is not present in the superimposing intensity change region 502, the calculation of the superimposing intensity is not performed, and the amplitude of the quantization threshold is set to "A".

In step S108, the additional information superimposing unit 108 performs, on the additional information superimposing region 501, superimposing processing using the superimposing intensity "A", the image data, and the additional information. In such a case, the additional information superimposing unit 108 superimposes code "0" and "1" according to the additional information. Also, in the invisible marker setting region 504, code "2" is superimposed. Also, in the superimposing intensity change region 502, code "3" is superimposed. When the processed pixel 505 is not present in the region on which the superimposing processing is performed in step S105, normal error diffusion processing is executed in step S110.

In step S109, it is determined whether or not error diffusion processing is completed for all the pixels. When it is determined that the processing has not been completed for all the pixels, the positional coordinates of the processed pixel 505 are updated, and the process returns to step S104. On the other hand, when it is determined that the processing is completed for all the pixels, the processing is terminated.

<Configuration of Extracting Superimposed Additional Information>

Next, description is given of extraction processing in which the additional information superimposed in the image data is extracted.

Figure 8:
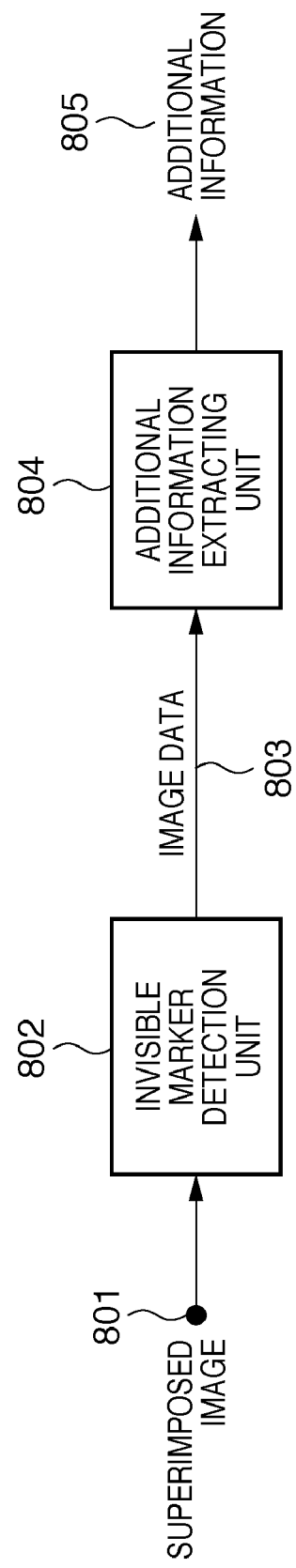
FIG. 8 is a diagram illustrating a block configuration for extracting additional information from image data in an embodiment.

FIG. 8 is a diagram illustrating a block configuration for extracting additional information from image data in this embodiment. A superimposed image is input from an input terminal 801. The input superimposed image may be image data of printed matter which is read by an optical reading device, a superimposed image obtained from a network such as Internet, or a superimposed image stored in hard disk or memory.

An invisible marker detection unit 802 detects an invisible marker from the superimposed image input from the input terminal 801. The detection of the invisible marker is performed, by analyzing the frequency of the entire superimposed image, and extracting the portion where the reaction of the invisible marker was found as a result of the frequency analysis. The detection method of the invisible marker may be frequency analysis such as a discrete cosine transform or a discrete Fourier transformation, or the detection may be performed through other known methods. When the invisible marker is detected by the invisible marker detection unit 802, the superimposed image in the invisible marker setting region is separated and output.

An additional information extracting unit 804 extracts additional information from the image region. First, image data 803 that was in the invisible marker setting region and was separated by the invisible marker detection unit 802 is input into the additional information extracting unit 804.

The separated and input superimposed image is divided into a superimposed block size of w×w (pixels). By analyzing the pattern periodicity for each divided block, the code that was superimposed can be analyzed, and the additional information 805 can be extracted from the image and output. Because Japanese Patent Laid-Open No. 2001-148778 has proposed this extraction method, the description thereof is omitted. The method for analyzing the pattern periodicity may be the above-described method, or maybe another known method. The additional information extracting unit 804 analyzes the patterns in the block, and extracts the additional information from the superimposed image.

<Operation of Extracting Superimposed Additional Information>

Figure 9:
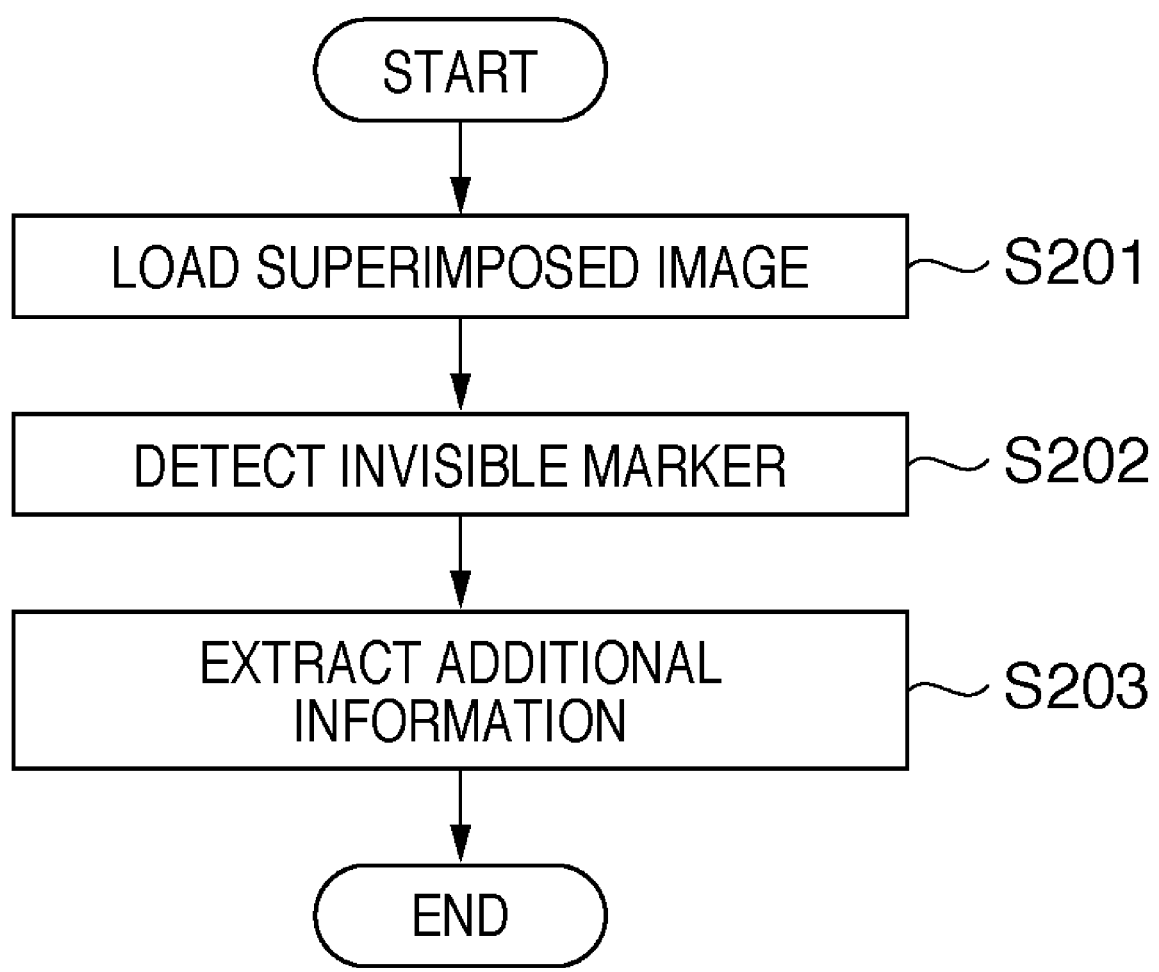
FIG. 9 is a flowchart illustrating processing procedures for extracting additional information in the configuration shown in FIG. 8.

Next, processing procedures for extracting additional information performed by the image processing apparatus with the above-described configuration are described. FIG. 9 is a flowchart illustrating processing procedures for extracting additional information in the configuration shown in FIG. 8.

First, in step S201, superimposed image on which the additional information is superimposed is loaded into the invisible marker detection unit 802. Next, in step S202, the invisible marker detection unit 802 detects the invisible marker from the superimposed image that was loaded.

In step S203, the detected image data in the invisible marker is input into the additional information extracting unit 804. The additional information extracting unit 804 divides the input image data into blocks, performs pattern analysis for each unit of blocks, and extracts the superimposed additional information. The additional information is extracted from the image by a set of procedures shown in FIG. 9.

According to the above-described first embodiment, by setting the superimposing intensity change region in which the superimposing intensity is changed, degradation of image quality in the proximity of the boundaries between the region where the additional information is superimposed and the region where the additional information is not superimposed can be decreased. Furthermore, because the superimposing intensity is not changed in the additional information superimposing region where the additional information is superimposed, highly robust superimposing processing can be performed.

Configuration of Second Embodiment

Hereinafter, an image processing apparatus of a second embodiment of the present invention is described. Note that the same reference numerals will be appended to the constituent elements that are the same as those of the first embodiment, and descriptions thereof will be omitted in this embodiment.

Figure 10:
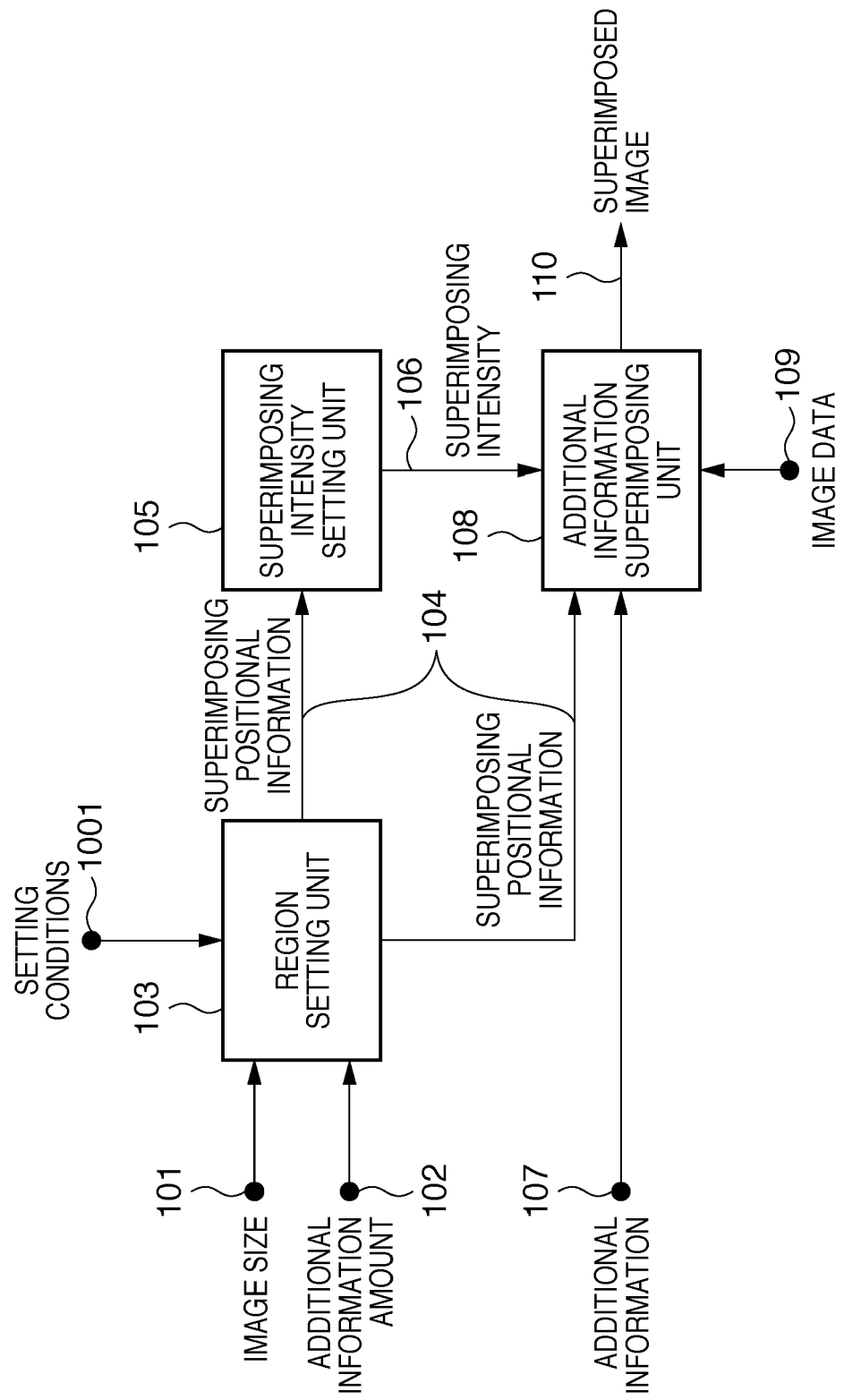
FIG. 10 is a block diagram illustrating the configuration of an image processing apparatus of a second embodiment.

FIG. 10 is a block diagram illustrating the configuration of an image processing apparatus of a second embodiment. The second embodiment is based on the first embodiment, and in the second embodiment, the region setting unit 103 is controlled according to setting conditions by which the superimposing processing is performed. Setting conditions by which superimposing is performed are input from an input terminal 1001 to the region setting unit 103. Settings of the superimposing intensity change region that is processed in the region setting unit 103 are controlled according to the input setting conditions.

<Setting Conditions>

The setting conditions at the time of superimposing processing are, for example, an input from the exterior made through settings performed by a user, image characteristics such as the image size, the importance of the additional information, and print settings made at the time the superimposed image is printed. Other conditions may be used as the setting conditions, and two or more conditions may be used in combination.

In the following, a description is given of a case where the region setting unit 103 is controlled according to print settings. The print settings include, for example, the printer type, print quality, and media type. A combination of such settings may be used for the settings. However, to simplify the descriptions, here, the print settings are the settings relating to print quality, and the superimposing intensity change region is changed according to, for example, a high image quality mode or a normal mode, set by an outside user, at the time of printing the superimposed image. Such settings are an example of a condition setting in this embodiment.

Figure 11:
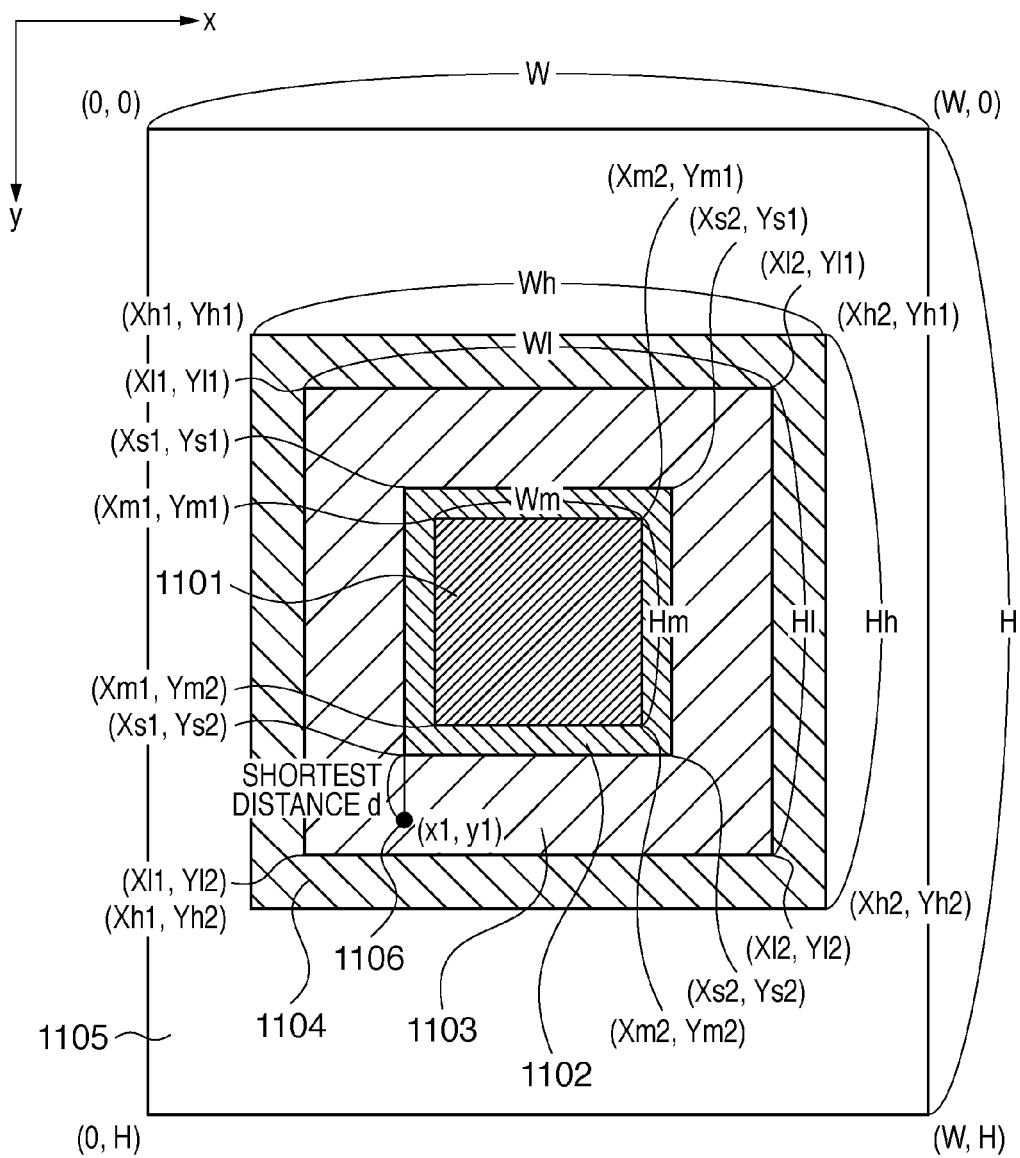
FIG. 11 is a diagram illustrating a superimposing intensity change region in a high image quality mode and in a normal mode.

FIG. 11 is a diagram illustrating a superimposing intensity change region in a high image quality mode and in a normal mode. The image region 1105 corresponds to the image region 503 shown in FIG. 5; an additional information superimposing region 1101 corresponds to the additional information superimposing region 501 shown in FIG. 5; and an invisible marker setting region 1102 corresponds to the invisible marker setting region 504 shown in FIG. 5. For the invisible marker setting region 1102, a single-block sized region surrounding the additional information superimposing region 1101 is set.

In this embodiment, a normal image quality superimposing intensity change region 1103 and a high image quality superimposing intensity change region 1104 are set. As in the first embodiment, each region is set as a region of an odd-numbered multiple of the additional information superimposing region. For illustrative purposes, a side of the normal image quality superimposing intensity change region 1103 is set to three times the side of the additional information superimposing region 1101. That is, width Wl of the region is set to Wl=Wm×3, and height Hl of the region is set to Hl=Hm×3.

Furthermore, a side of the high image quality superimposing intensity change region 1104 is set to five times the side of the additional information superimposing region 1101. That is, width Wh of the region is set to Wh=Wm×5, and height Hh of the region is set to Hh=Hm×5. Although the high image quality superimposing intensity change region 1104 and the normal image quality superimposing intensity change region 1103 are simultaneously shown in FIG. 11 to simplify the descriptions, in reality, one of the superimposing intensity change regions is set according to the print settings.

<Settings of Superimposing Intensity>

As in the first embodiment, when the superimposing intensity is changed in the superimposing intensity setting unit 105 according to the distance from the invisible marker setting region 1102, the superimposing intensity "Ah'" of the high image quality mode for the processed pixel 1106 can be calculated as in the following formula:

$$Ah'=d/(Yh2-Ys2)\times A \quad (3)$$

The superimposing intensity "Al'" in the normal mode can be calculated as in the following formula.

$$Al'=d/(Yl2-Ys2)\times A \quad (4)$$

Reference numeral "d" included in formula (3) and formula (4) is calculated from formula (1). When the processed pixel 1106 is at a position other than the position shown in the figure, the formula is modified so as to be able to calculate the shortest distance to the invisible marker setting region 1102, as in the first embodiment.

Because the denominator in formula (3) (Yh2−Ys2) for the high image quality mode is larger and the changing rate of intensity is small compared with the normal mode in terms of the magnitude relationship between the denominator of formula (3) for the high image quality mode and the denominator of formula (4) (Yl2−Ys2) for the normal mode, the visual influence is small. Thus, the superimposing intensity can be changed by changing the superimposing intensity change region according to the print settings. A case where the high image quality superimposing intensity change region 1104 is larger than the normal image quality superimposing intensity change region 1103 has been used for descriptions. However, the high image quality superimposing intensity change region 1104 may be set smaller than the normal image quality superimposing intensity change region 1103 according to the characteristics of the method of superimposition.

<Superimposing Operation Flow>

Figure 12:
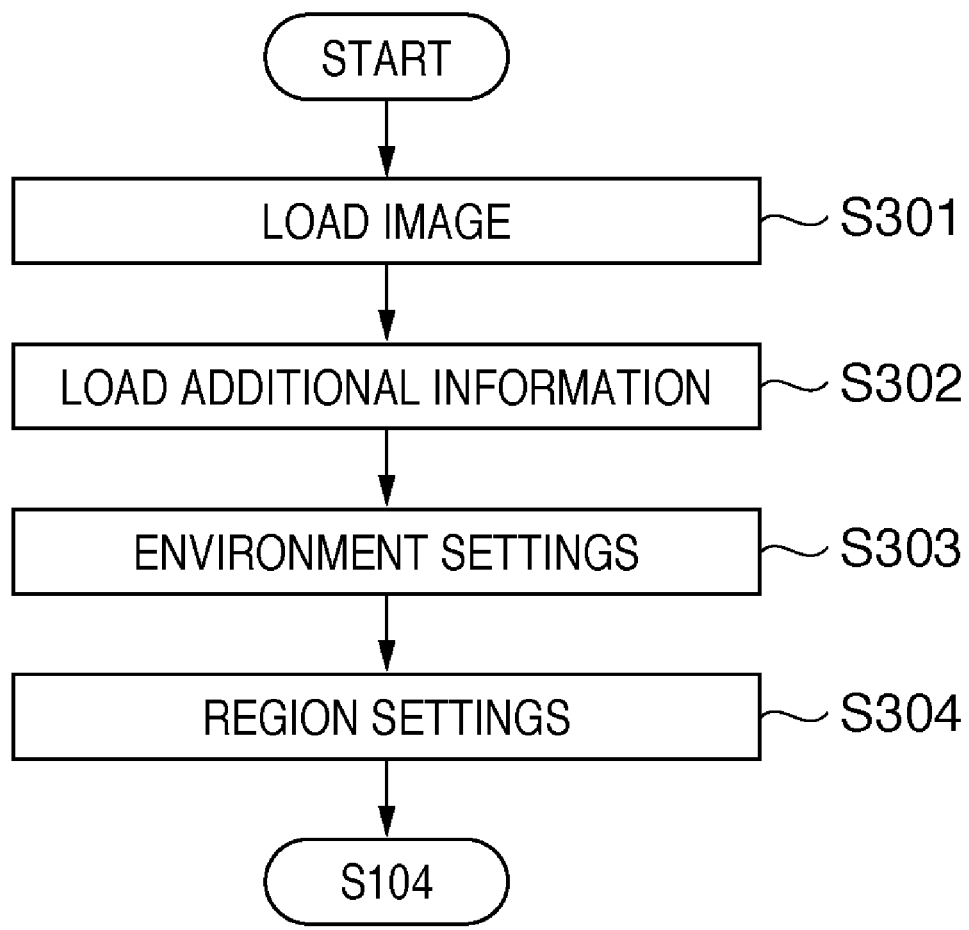
FIG. 12 is a flowchart illustrating operation procedures of superimposing processing in the second embodiment.

FIG. 12 is a flowchart illustrating operation procedures of superimposing processing in the second embodiment. Steps S104 to S110 have the same processing as that in the first embodiment shown in FIG. 7.

First, in step S301, image data is loaded, and in step S302, additional information to be superimposed is loaded. Next, in step S303, setting conditions for superimposing processing are input to the region setting unit 103. In this embodiment, print settings used when printing the superimposed image are input.

In step S304, an additional information superimposing region 1101, an invisible marker setting region 1102, and a superimposing intensity change region are set in the region setting unit 103 based on the input print settings. At this time, the superimposing intensity change region is controlled according to the input setting conditions.

The processing after step S304 is the same as the processing shown in FIG. 7, but when it is determined in step S106 that the pixel to be processed is in the superimposing intensity change region, the input setting conditions (in the case of conditions relating to print quality), that is, formula (3) or (4), are used for the formula for calculating the superimposing intensity. Because the configuration of extracting the additional information and its operational procedures are the same as those of FIG. 8 and FIG. 9 described in the first embodiment, descriptions thereof are omitted.

According to the second embodiment, the superimposing intensity change region is controlled based on the setting conditions for superimposition. As a result, compared with the case where control is not performed, degradation of image quality in the proximity of the boundaries between the region where the additional information is superimposed and the region where the additional information is not superimposed can be further decreased, and high image quality can be achieved in the proximity of the boundaries. Furthermore, because the superimposing intensity is not changed in the additional information superimposing region where the additional information is superimposed, highly robust characteristics can be achieved.

Configuration of Third Embodiment

Hereinafter, the image processing apparatus of the third embodiment of the present invention is described. Note that the same reference numerals will be appended to the constituent elements that are substantially the same as those of the first and the second embodiment, and descriptions thereof will be omitted in this embodiment. The third embodiment is based on the first embodiment, and in the third embodiment, the superimposing intensity is controlled according to the setting conditions by which superimposing processing is performed.

Figure 13:
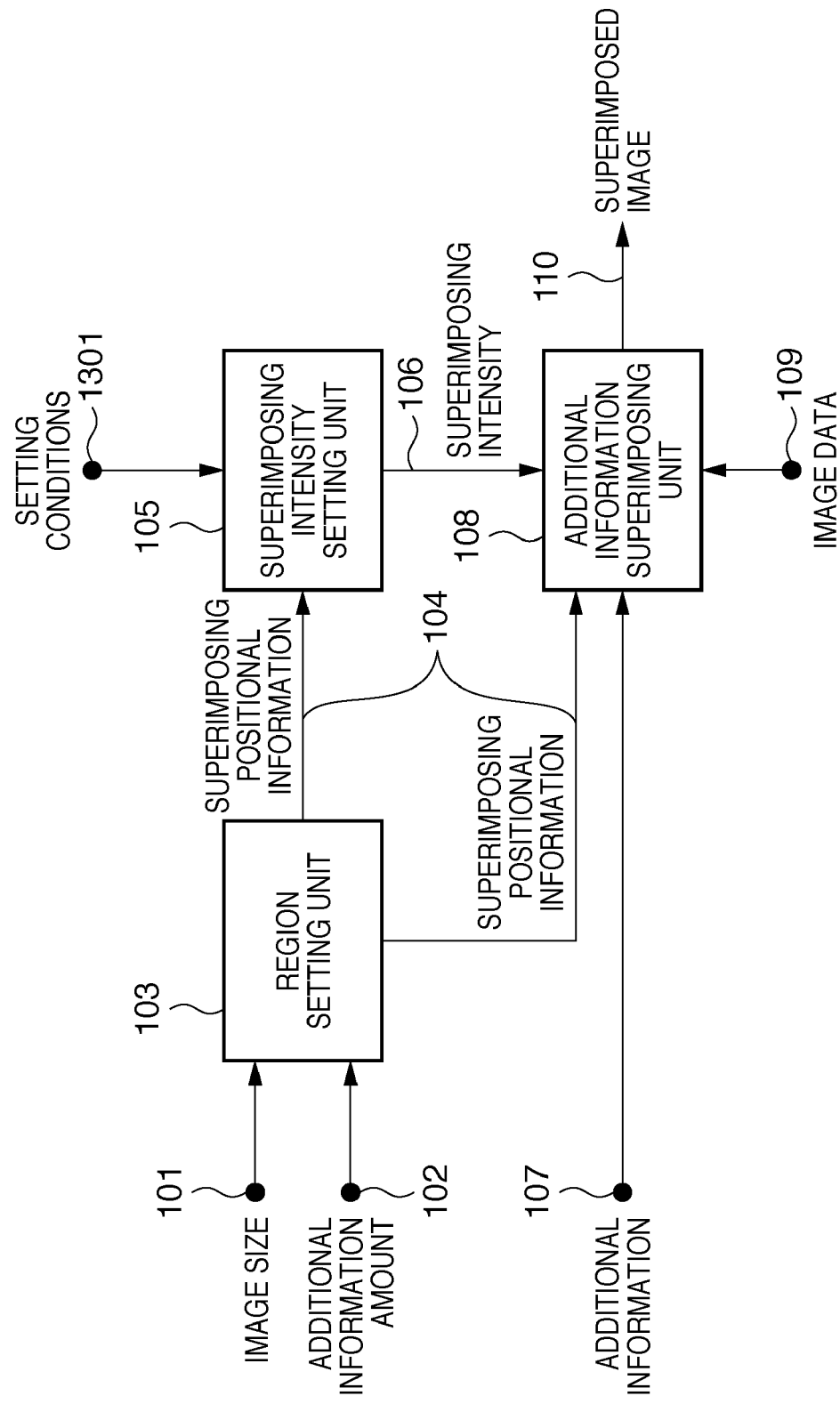
FIG. 13 is a block diagram illustrating the configuration of an image processing apparatus in a third embodiment.

FIG. 13 is a block diagram illustrating the configuration of an image processing apparatus in a third embodiment of the present invention. Setting conditions by which superimposing processing is performed are input to the superimposing intensity setting unit 105 from an input terminal 1301. In the third embodiment, the superimposing intensity is controlled according to setting conditions by which superimposing processing is performed.

<Setting Conditions>

The setting conditions at the time of superimposing processing are, for example, image characteristics such as an image size, importance of the additional information, and print settings at the time of printing the superimposed image. Other conditions may be used as the setting conditions, and two or more conditions may be used in combination. For illustrative purposes, as in the second embodiment, the print quality at the time of printing a superimposed image is used as the setting conditions. Such settings are, as in the first embodiment, an example of a condition setting in this embodiment.

<Settings of Superimposing Intensity>

In the third embodiment, in the superimposing intensity setting unit 105, a table (superimposing intensity setting table) is referred to when changing the superimposing intensity. The table to be referred to is changed according to the print settings of a high image quality mode or a normal mode. In the following descriptions, region settings relating to superimposing processing are the same as those of FIG. 5 shown in the first embodiment, and shortest distance d between the processed pixel 505 and the invisible marker setting region 504 is calculated using formula (1).

Figure 14:
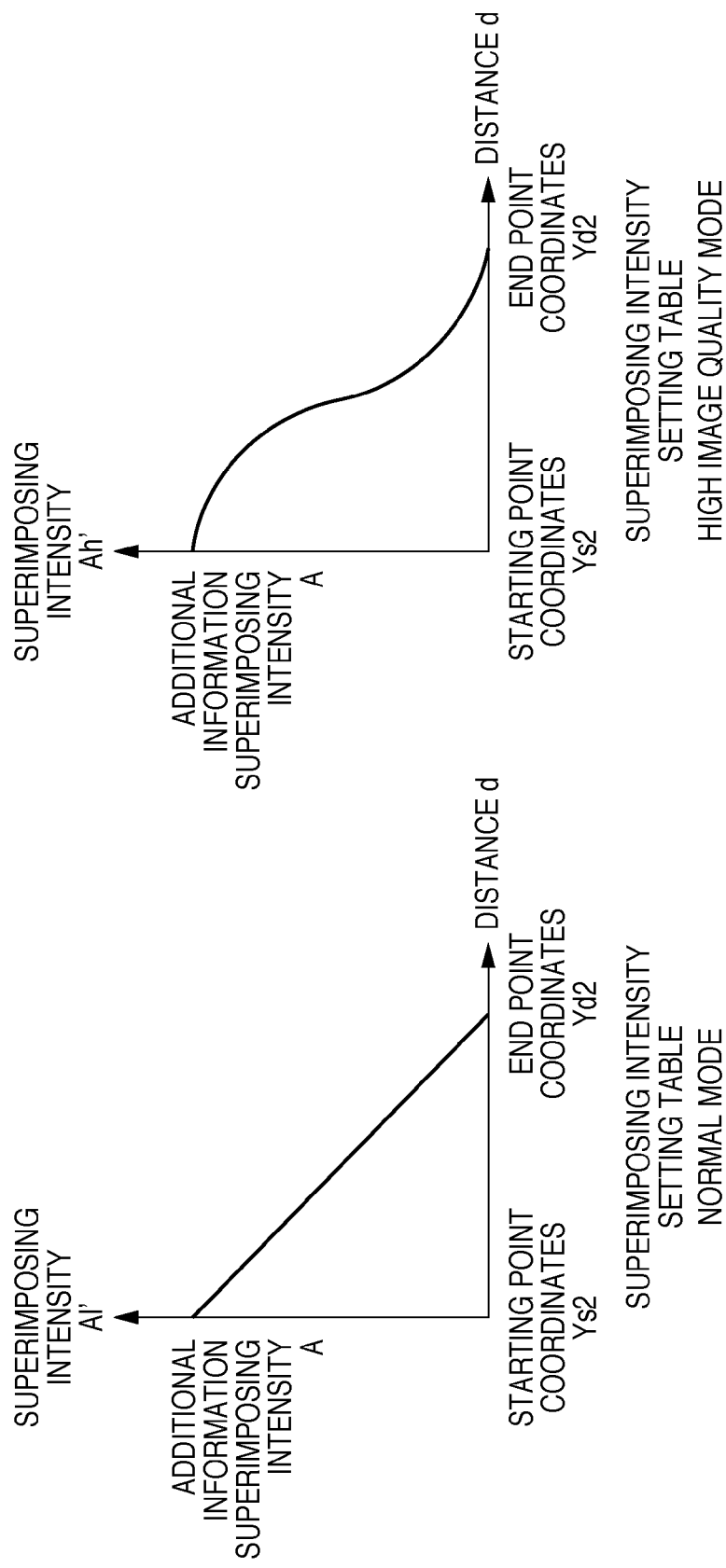
FIGS. 14A and 14B are superimposing intensity setting tables.

FIG. 14A and FIG. 14B are superimposing intensity setting tables. FIG. 14A is a table which is referred to in the normal mode, and FIG. 14B is a table which is referred to in the high image quality mode. The horizontal axis in these figures is distance d from the invisible marker setting region 504, and the vertical axis shows the superimposing intensity. Superimposing intensity "A" is a superimposing intensity at which the additional information is superimposed in the additional information superimposing region 501 and the invisible marker setting region 504. The tables shown in FIG. 14A and FIG. 14B may be stored, for example, in a storage region such as a memory in the image processing apparatus.

Comparing the two tables, there is less visual influence in the high image quality mode because the change of the superimposing intensity in the proximity of end point coordinates $Yd2$ is very small and the difference from the region where superimposing is not performed is small compared with the normal mode. As a result, high image quality regional superimposition is possible.

When the print settings are set to the high image quality mode, the setting conditions are input to the superimposing intensity setting unit 105. According to the input conditions, the table of the high image quality mode is set as the table to which reference is made.

The shortest distance d between the processed pixel 505 and the invisible marker setting region 504 is calculated using formula (1). Next, values corresponding to distance d that was calculated using the table that was set are referred to, and the superimposing intensity is set. In the case of the normal mode print settings, the superimposing intensity is set in the same manner.

<Superimposing Operation Flow>

Figure 15:
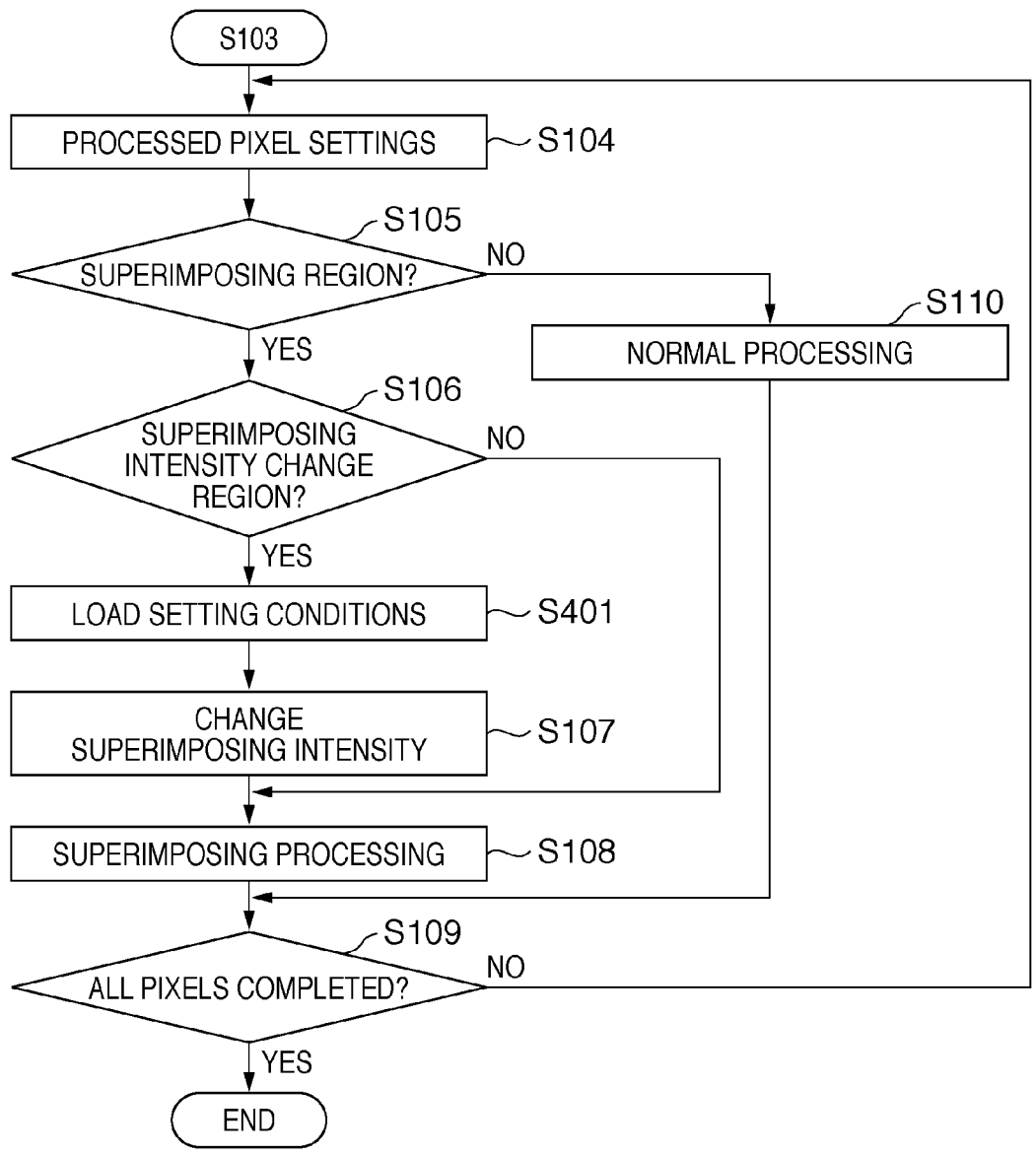
FIG. 15 is a flowchart illustrating processing procedures performed by an image processing apparatus of the third embodiment.

Next, operational procedures performed by the image processing apparatus with the above-described configuration are described. FIG. 15 is a flowchart illustrating processing procedures performed by an image processing apparatus of the embodiment shown in FIG. 13. Steps S101 to S103 are the same as the processing in the first embodiment shown in FIG. 7.

After the determination processing in step S106, the setting conditions for performing superimposing processing are input to the superimposing intensity setting unit 105 in step S401, and the superimposing intensity setting table is set according to the input setting conditions. In step S107, distance d from the position of the processed pixel 505 to the invisible marker setting region 504 is calculated, and the superimposing intensity is set using a table based on the distance d. The configuration for extracting additional information and its operational procedures are the same as those described FIG. 8 and FIG. 9 in the first embodiment, and thus descriptions thereof are omitted.

According to the third embodiment, by setting the table that changes the superimposing intensity based on the setting conditions for superimposing processing, degradation of image quality in the proximity of the boundaries between the region where the additional information is superimposed and the region where the additional information is not superimposed can be decreased. Furthermore, because the superimposing intensity is not changed in the additional information superimposing region where the additional information is superimposed, highly robust characteristics can be achieved.

Configuration of Fourth Embodiment

Hereinafter, the image processing apparatus of the fourth embodiment of the present invention is described. Note that the same reference numerals will be appended to the constituent elements that are the same as those of the first embodiment, and descriptions thereof will be omitted in this embodiment.

Figure 16:
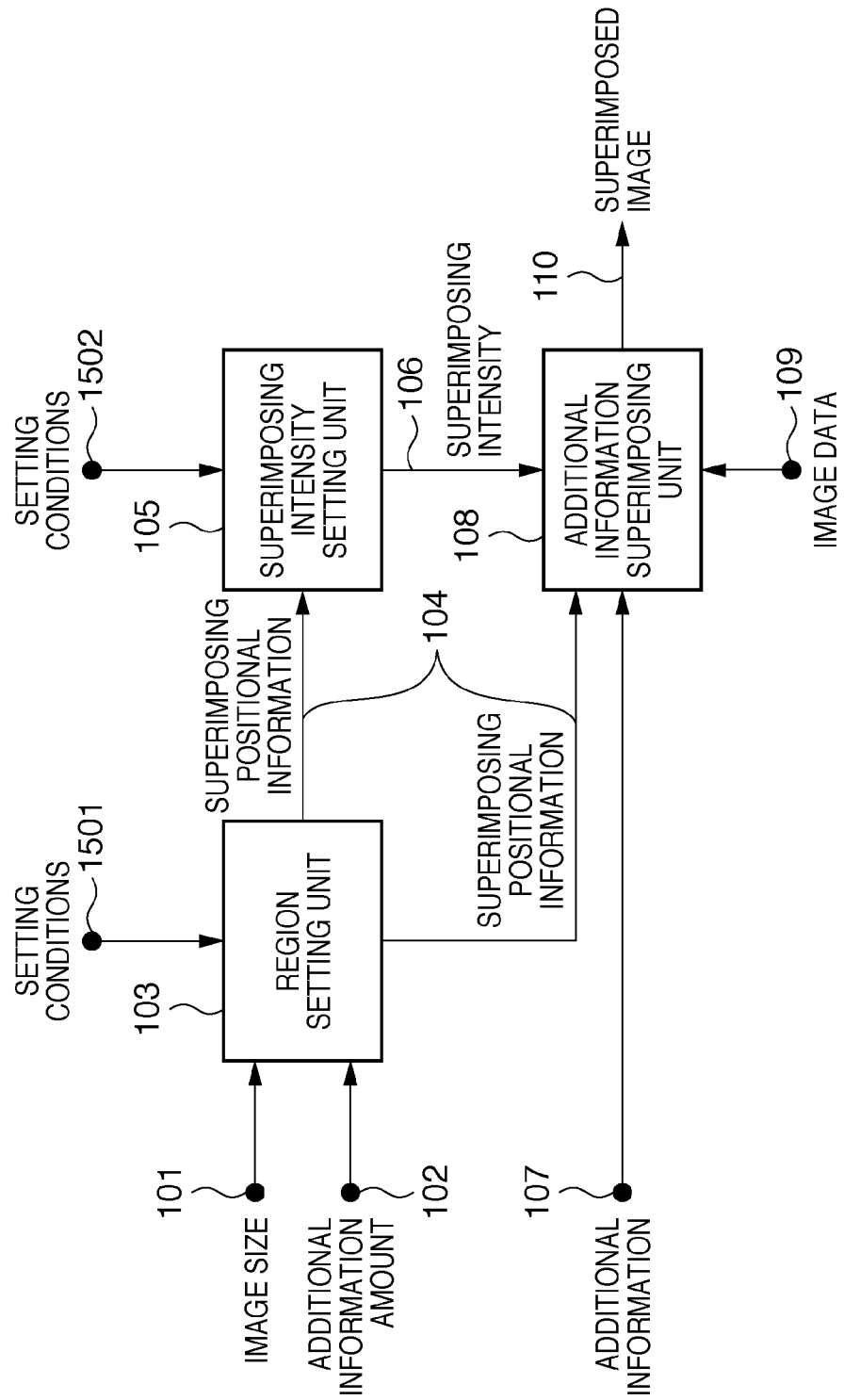
FIG. 16 is a block diagram illustrating the configuration of an image processing apparatus according to a fourth embodiment.

FIG. 16 is a block diagram illustrating the configuration of an image processing apparatus according to a fourth embodiment. The fourth embodiment is based on the first embodiment, and in the fourth embodiment, the region setting unit 103 and the superimposing intensity setting unit 105 are controlled according to the setting conditions for performing superimposing processing. The setting conditions for superimposition are input to the region setting unit 103 and the superimposing intensity setting unit 105 from input terminals 1501 and 1502, respectively.

<Setting Conditions>

The setting conditions at the time of superimposing processing are, for example, image characteristics such as the image size, the importance of additional information, and print settings at the time of printing the superimposed image. Other conditions may be used as the setting conditions, and two or more conditions may be used in combination. Furthermore, the setting conditions input from the input terminal 1501 may be the same as the setting conditions input from the input terminal 1502, or the setting conditions may be different.

Hereinafter, descriptions are given regarding a case where the region setting unit 103 and the superimposing intensity setting unit 105 are controlled according to the print settings. The print settings include, for example, the printer type, print quality, and media type. A combination of such conditions may be used for the settings. However, to simplify the descriptions in this embodiment, the print settings are settings relating to print quality, and the superimposing intensity change region and the superimposing intensity are changed according to the high image quality mode and the normal mode at the time of printing the superimposed image.

In the region setting unit 103, as described in the second embodiment, the superimposing intensity change region is set according to the setting conditions. Furthermore, in the superimposing intensity setting unit 105, as described in the third embodiment, the table to which reference is made at the time of setting the superimposing intensity is set according to the setting conditions.

<Calculation of Superimposing Intensity>

A summary of superimposing intensity settings in this embodiment shall be given. First, as shown in FIG. 11, an additional information superimposing region 1101 and an invisible marker setting region 1102, as well as a normal image quality superimposing intensity change region 1103 or a high image quality superimposing intensity change region 1104, are set according to the setting conditions in the region setting unit 103. Next, the positional information of each region is output as superimposing positional information 104. The method for setting each region is the same as that described in the second embodiment.

Next, the superimposing positional information 104 and the setting conditions input from the input terminal 1502 are input to the superimposing intensity setting unit 105. When the processed pixel 1106 is at the position shown in FIG. 11, the shortest distance d between the processed pixel 1106 and the invisible marker setting region 1102 is calculated using formula (3) or (4).

Furthermore, in the superimposing intensity setting unit 105, a superimposing intensity setting table that is used at the time of setting the superimposing intensity is determined based on the setting conditions input from the input terminal 1502. In the table that is determined, the superimposing intensity 106 corresponding to the calculated distance d is set. In the additional information superimposing unit 108, superimposing processing is performed using the superimposing intensity 106.

<Superimposing Operation Flow>

Figure 17:
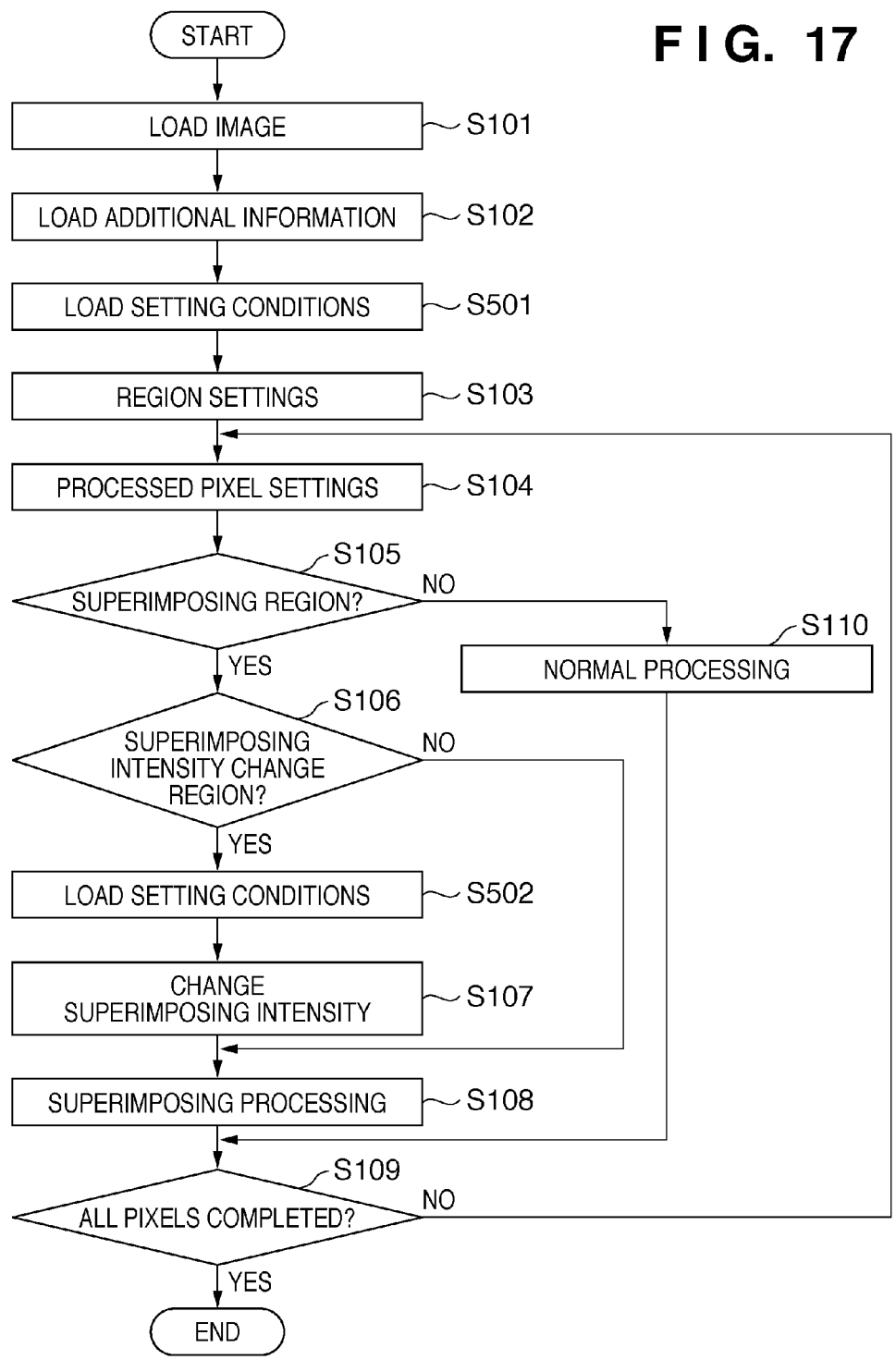
FIG. 17 is a flowchart illustrating operational procedures of superimposing processing in the fourth embodiment.

FIG. 17 is a flowchart illustrating operational procedures of superimposing processing in the fourth embodiment; however, because this is a combination of the second embodiment and the third embodiment, detailed descriptions thereof shall be omitted. After the image data and additional information are input in step S101 and S102, setting conditions are loaded in step S501. For the setting conditions, print quality relating to the print environment is set. The setting conditions of print quality are input to the region setting unit 103. In step S103, region settings are performed in the region setting unit 103 for performing superimposing processing based on the input setting conditions.

Furthermore, when the processing enters changing the superimposing intensity following the determination relating to changes in superimposing intensity (step S106), in step S502, the setting conditions input from the input terminal 1502 are input to the superimposing intensity setting unit 105. The superimposing intensity setting table is set according to the input setting conditions. In step S107, the distance d from the position of the processed pixel 1106 to the invisible marker setting region 1102 is calculated, and the superimposing intensity corresponding to the distance d is set using the table. Descriptions of the processing flow thereafter shall be omitted because it is the same as that of the first embodiment.

According to the fourth embodiment, the superimposing intensity change region is controlled based on the setting conditions for superimposing processing, and further, by controlling the superimposing intensity settings, high image quality in the proximity of the superimposing boundaries can be achieved. Furthermore, because the superimposing intensity is not changed in the additional information superimposing region where the additional information is superimposed, highly robust characteristics can be achieved.

It goes without saying that the object of the present invention is also achieved by the following system or apparatus. A storage medium (or recording medium) recording the program code of software that realizes the functions of the foregoing embodiment is supplied to a system or apparatus. A computer (or CPU, MPU) in the system or apparatus then reads and executes the program code stored on the storage medium. In this case, the actual program code read from the storage medium realizes the functions of the foregoing embodiment, and the storage medium storing this program code constitutes the present invention.

The functions of the foregoing embodiment are not only realized by a computer executing the read program (image processing program) code. The following case is also covered by the present invention. An operating system (OS) or the like running on a computer performs part or all of the actual processing based on instructions in the program code, with the functions of the above embodiment being realized as a result of this processing.

Further, the following case is also covered by the present invention. That is, the program code read from the storage medium is written to a memory provided in a function expansion card inserted in a computer or a function expansion unit connected to a computer. A CPU or the like provided in the function expansion card or the function expansion unit then performs part or all of the actual processing based on instructions in the program code, with the functions of the above embodiment being realized as a result of this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-116296, filed Apr. 25, 2008, which is hereby incorporated by reference herein in its entirety.

What is claimed is:

1. An image processing apparatus that superimposes additional information on image data, the apparatus comprising:
a region setting unit that sets, in the image data, a first region and a second region on which the additional information is respectively superimposed with a constant superimposing intensity, and a third region on which the additional information is superimposed with a non-constant superimposing intensity, wherein the second region is between the first region and the third region;
a superimposing intensity setting unit that sets the superimposing intensity according to a position of a target pixel; and
a superimposing unit that superimposes the additional information on image data of the target pixel using the superimposing intensity set by the superimposing intensity setting unit, the superimposing intensity being set to be constant when the position of the target pixel is in the first region or the second region and the superimposing intensity being changed according to the position of the target pixel when the position of the target pixel is in the third region, so that the superimposing unit superimposes the additional information on the first and second region with the constant superimposing intensity and superimposes the additional information on the third region with the superimposing intensity set by the superimposing intensity setting unit,
wherein a pattern as the additional information for superimposing on the second region is different from a pattern as the additional information for superimposing on the first region and is different from a pattern as the additional information for superimposing on the third region.

2. The image processing apparatus according to claim 1, further comprising a condition setting unit configured to set conditions for the superimposition.

3. The image processing apparatus according to claim 2, wherein the region setting unit sets, in the image data, the first region, the second region and the third region.

4. The image processing apparatus according to claim 2, wherein the superimposing intensity setting unit sets, in the third region, the superimposing intensity according to the target pixel and the conditions set by the condition setting unit.

5. The image processing apparatus according to claim 1, wherein the superimposing intensity setting unit sets the superimposing intensity according to the distance from a target pixel to the second region.

6. The image processing apparatus according to claim 1, wherein the additional information is superimposed on the image data by an error diffusion method.

7. The image processing apparatus according to claim 1, wherein the additional information is superimposed on the image data through a frequency transform.

8. The image processing apparatus according to claim 1, further comprising an extracting unit configured to detect the pattern superimposed on the second region from the image data on which the additional information is superimposed by the superimposing unit, specify the first region, and extract the additional information superimposed on the first region.

9. A method for image processing executed in an image processing apparatus that superimposes additional information on image data, the method comprising the steps of:
setting by the image processing apparatus, in the image data, a first region and a second region on which the additional information is respectively superimposed with a constant superimposing intensity, and a third region on which the additional information is superimposed with a non-constant superimposing intensity, wherein the second region is between the first region and the third region;
setting, by the image processing apparatus, the superimposing intensity according to a position of a target pixel, and
superimposing, by the image processing apparatus, the additional information on image data of the target pixel using the superimposing intensity set in the step of setting the superimposing intensity, the superimposing intensity being set to be constant when the position of the target pixel is in the first region or the second region and the superimposing intensity being changed according to the position of the target pixel when the position of the target pixel is in the third region, so that the image processing apparatus superimposes the additional information on the first and second region with the constant superimposing intensity and superimposes the additional information on the third region with the superimposing intensity set in the step of setting the superimposing intensity,
wherein a pattern as the additional information for superimposing on the second region is different from a pattern as the additional information for superimposing on the first region and is different from a pattern as the additional information for superimposing on the third region.

10. The method according to claim 9, further comprising the step of detecting the pattern superimposed on the second region from the image data on which the additional information is superimposed by the superimposing unit, specifying the first region, and extracting the additional information superimposed on the first region.

11. A non-transitory computer-readable medium storing an image processing program for superimposing additional information on image data, the program causing a computer to function to:
set, in the image data, a first region and a second region on which the additional information is respectively superimposed with a constant superimposing intensity, and a third region on which the additional information is superimposed with a non-constant superimposing intensity, wherein the second region is between the first region and the third region;
set the superimposing intensity according to a position of a target pixel, and superimpose the additional information on image data of the target pixel using the set superimposing intensity, the superimposing intensity being set to be constant when the position of the target pixel is in the first region or the second region and the superimposing intensity being changed according to the position of the target pixel when the position of the target pixel is in the third region, so as to superimpose the additional information on the first and second region with the constant superimposing intensity and superimpose the additional information on the third region with the superimposing intensity set according to the position of the target pixel, wherein a pattern as the additional information for superimposing on the second region is different from a pattern as the additional information for superimposing on the first region and is different from a pattern as the additional information for superimposing on the third region.

* * * * *